FIP8102 XR 3,500,459

TIME LIMITED TRANSMISSIONS

Filed Aug. 31, 1966

INVENTORS
JOHN W. BATTIN,
JIMMY PAUL COMBS.
BY
Mueller, Aichele & Rauner
ATTYS.

United States Patent Office 3,500,459
Patented Mar. 10, 1970

3,500,459

TIME LIMITED TRANSMISSIONS

John W. Battin, Naperville, and Jimmy Paul Combs, Oak Park, Ill., assignors to Motorola, Inc., Franklin Park, Ill., a corporation of Illinois Filed Aug. 31, 1966, Ser. No. 576,474
Int. Cl. H04b *1/02*
U.S. Cl. 325—133 12 Claims

ABSTRACT OF THE DISCLOSURE

Control system for limiting duration of continuous transmission of a transmitter operating with other transmitters on a single channel, wherein the transmitter is actuated by operation of the push-to-talk switch. A timing unit is actuated when the transmission starts to start the timed period and operates to terminate transmission after a predetermined time by disabling a section of the transmitter or removing operating voltage therefrom. An alerting signal is provided when the transmission is terminated, as by an audio tone from a receiver used with the transmitter.

This invention relates to transmitters which produce a carrier signal and controls therefor and particularly to transmitters sharing a transmission path with other transmitters.

In single-path radio or wire networks having a plurality of transmitters, only one transmitter may emit signals at any given time. In transmitters utilizing AC carrier signals the transmission of such AC carrier, with or without modulation, prevents other transmitters from using the network. The carrier signal transmission indicates a transmitter has been actuated for transmission. In single-path wire networks utilizing keyed DC current, a transmitter, such as a transmitter-distributor, indicates to a wire line network that it is ready to transmit by supplying a current to the line. The term "carrier" or "carrier signal" as used herein is intended to include all types of transmission indicating signals usable in communication networks.

In the event a transmitter becomes permanently keyed, such that a carrier signal is continuously transmitted, the network becomes unusable. Further, one transmitter by continuously transmitting may tie up the network preventing other transmitters from transmitting. It is therefore, desired to limit the time a transmitter may continuously emit a carrier or other transmission indicating signal.

Accordingly, it is an object of this invention to provide controls for transmitters which time limit each continuous transmission.

It is another object of this invention in combination with the immediately preceding object to provide an operator indicating signal when the transmitter has exceeded the permitted continuous transmission time.

It is another object of this invention to provide a transmitter having a control for time limiting continuous transmission, which control is automatically reset upon the termination of each transmission.

A transmitter is provided having a timing unit which measures the continuous transmission time of the transmitter each time it is actuated for transmission. The timing unit indicates the expiration of a predetermined time limit. The indication actuates a control for blocking further emission of a carrier by the transmitter. Such blocking may be provided in the tuned circuits of the carrier signal portion of the transmitter, i.e., carrier oscillator, the modulator, frequency multipliers, output amplifiers, or IF amplifiers. Alternatively, a supply voltage may be removed from the carrier signal section. In this regard, a portion of the transmitter power supply is considered a part of the carrier signal section in that one of the supply voltages may be operative to activate the section into transmitting a carrier signal. Upon the expiration of the predetermined time limit, an indicating signal is provided for an operator. In one form the indicating signal is produced by a tone generator actuated by the timing unit, and which provides a tone signal to the audio portion of a radio receiver. The arrangement is such that upon termination of a transmission, as by the release of a push-to-talk button, the timing unit is automatically reset for permitting another continuous transmission of carrier signal up to the predetermined time limit.

Referring now to the accompanying drawing.

According to this invention a timing unit, such as a resistor-capacitor charging or discharging circuit, is provided in a transmitter and is actuated when the transmitter is activated to transmit a carrier signal, for example, by the closure of the push-to-talk switch in a mobile transmitter. By measuring the time a supply voltage is provided to the transmitter carrier signal section, the timer measures the elapsed time since the push-to-talk switch was closed. Upon expiration of a predetermined time limit, the timing unit actuates a switch which automatically and rapidly de-activates the carrier signal section of the transmitter even though the push-to-talk switch is still closed. This may be done by radically detuning a tuned circuit in the carrier signal section, such as detuning a modulator, a frequency multiplier, output amplifier or other radio frequency amplifiers. Alternatively, circuits may be provided to the transmitter power supply which are effective to remove the supply voltage from the carrier signal section.

Simultaneously with inhibiting the emission of carrier, the operator of the transmitter receives an indication that carrier emission is being blocked. For example, a tone generator is actuated and connected to a radio receiver at the site for producing an audible tone. Alternatively, a light on the panel of the transmitter may be lit.

Upon opening of a push-to-talk switch, or other control which initiates transmission of a carrier signal, the timer is automatically reset for permitting another subsequent period of carrier transmission. As used herein, the term "carrier" is intended to include the carrier itself and all the attendant modulation components and any other transmission indicating signal.

Figure 1:
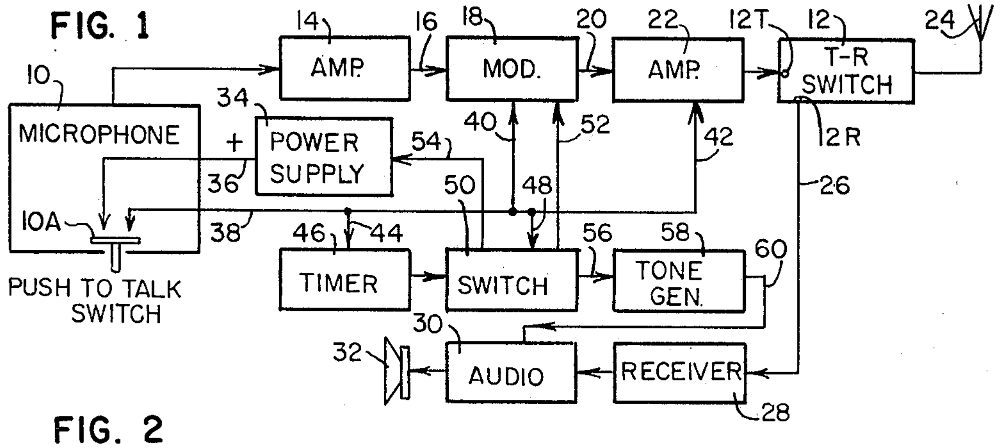
FIG. 1 is a block diagram of a transmitter-receiver combination incorporating the teaching of this invention.

Referring now more particularly to FIG. 1, a transmitter-receiver combination is used to illustrate this invention. Microphone 10, including push-to-talk switch 10A for activating the transmitter, is connected to the audio amplifier 14. The amplified audio signals are provided over line 16 to modulator 18. In this diagram, modulator 18 is intended to include the carrier frequency oscillator and the various frequency multiplying circuits found in a frequency modulation transmitter, no limitation thereto being intended. The modulated carrier signal is provided over line 20 to output amplifier 22. The carrier signal is then provided through terminal 12T and transmit-receive (TR) switch 12 to antenna 24.

Upon release of push-to-talk button 10A, TR switch 12 connects terminal 12R to the antenna. Incoming signals intercepted by antenna 24 are provided through the TR switch 12 and over line 26 to the receiver 28 which contains the RF amplifier, detector and IF sections. Audio amplifier section 30 receives the detected signal from receiver 28 and provides it to speaker 32 or other audio output transducer.

Power supply 34 supplies voltages to all components shown in the diagram in the usual manner. As used herein, the term "power supply" is intended to include any energy source used to provide power to the transmitter and receiver, such as a battery, voltage regulators, high voltage supply, transistorized supplies and the like. Additionally, over line 36 and through push-to-talk switch 10A, it supplies an operating voltage to modulator 18 and amplifier 22 enabling the transmission of a carrier signal through antenna 24. It is to be understood that the indicated connection of switch 10A is schematic, and in a practical transmitter there may be interposed relays for protecting the operator from voltages attendant power supply 34 and the generation, amplification and emission of a carrier signal. The supply voltage from power supply 34 is provided over line 38 and thence over line 40 to modulator 18, and over line 42 to amplifier 22. In addition to the above described connections, the supply voltage is also applied over line 44 to timer 46 which measures the elapsed time that such supply voltage has been continuously provided over the lines 40 and 42. Such voltage is also applied over line 48 to switch circuit 50 which is responsively connected to timer 46 such that when a predetermined continuous transmission time limit has been exceeded, as indicated by the continuous supply of voltage over line 38, switch circuit 50 is actuated to its active condition. Switch 50 is connected over line 52 to modulator 18 for detuning the modulator such that no signal can pass therethrough, thereby inhibiting emission of a carrier signal. Alternatively, switch 50 may be connected to amplifier 22 for blocking the carrier signal therein. It is preferred, however, to block the signal at its lowest energy level. As another alternative, line 54 connecting switch 50 to power supply 34 is indicated. By use of such a connection, switch 50 can deactivate power supply 34 so that no voltage is provided over line 38, to thereby deactivate modulator 18 and amplifier 22.

Simultaneously with the suppression of or blocking the carrier signal, an indicating signal is provided over line 56 to actuate tone generator 58. A tone signal is provided over line 60 into audio section 30 for producing a tone in speaker 32 indicating to the operator that the carrier and its modulation components are being blocked because of the expiration of the transmission time limit.

Release of push-to-talk switch 10A interrupts the supply voltage applied to lines 38 and 44 causing timer 46 to reset, deactivating switch 50. With switch 50 deactivated, the carrier signal is no longer suppressed or blocked and a new transmission may be initiated.

As used herein the term "carrier signal section" of the transmitter is intended to indicate those portions of the transmitter directly associated with generation, amplification, and emission of a carrier signal, such as modulator 18, amplifier 22, TR switch 12, antenna 24 and that portion of power supply 34 providing a voltage over line 38 for activating modulator 18 and amplifier 22.

Figure 2:
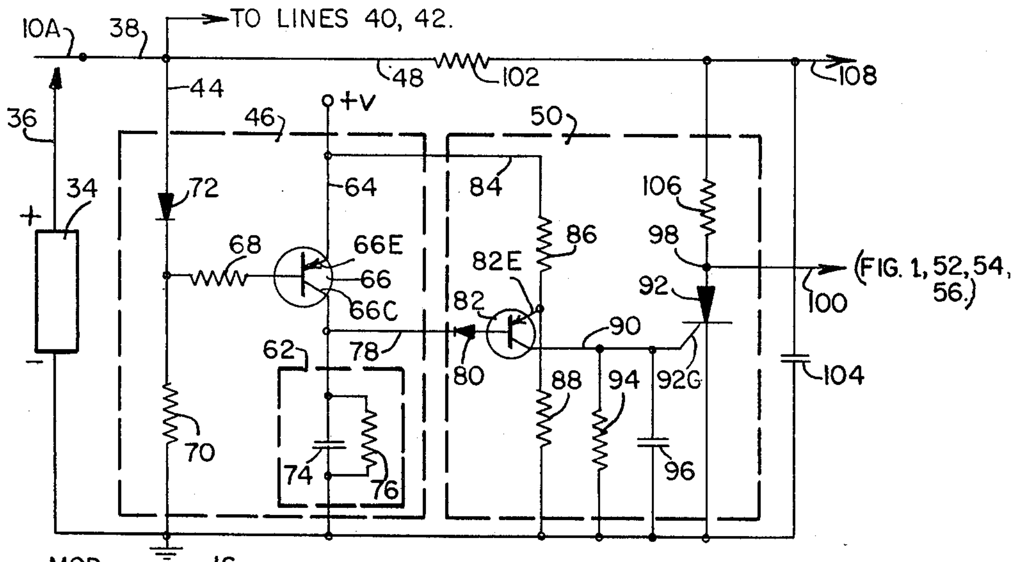
FIG. 2 is a schematic diagram of a timing unit and tone generator as may be used in the FIG. 1 embodiment.

FIG. 2 shows one form in which the timer of the system described in FIG. 1 can be provided. The timing unit 46 is shown as including resistance-capacitance timing element 62. Voltage source +V is continuously provided, as by power supply 34, over line 64 to the emitter portion 66E of transistor switch 66. Transistor switch 66 is normally (switch 10A open) conducting current from source +V due to the bias provided by current flowing through the emitter 66E and thence out the base electrode through resistors 68 and 70 to ground reference potential. The base current is such that the diode 72 is reversed biased. Current through collector 66C rapidly charges capacitor 74 of timing element 62. After capacitor 74 has been charged, current from transistor switch 66 flows through timing resistor 76 to ground reference potential.

Timing action of unit 46 is initiated by closing push-to-talk switch 10A and providing voltage over line 44 to forward bias diode 72. This action provides a positive voltage at the juncture of resistors 68 and 70 and thereby reverse biases transistor switch 66 to non-conduction. Timing element 62 then is isolated from its supply voltage +V. Capacitor 74 discharges its positive charge through resistor 76. A typical time constant for discharging capacitor 74 is one minute.

Electro-responsive switch 50 receives the voltage on capacitor 74 over line 78. This is applied througs isolation diode 80 to the base electrode of transistor 82, with diode 80 protecting the transistor from positive voltages on capacitor 74. The +V volts is connected over line 84 through resistor 86 to the emitter electrode 82E of transistor 82. Resistor 88 completes the circuit to ground. When the voltage on capacitor 74 has reached the time limit expiration indicating amplitude, transistor 82 is biased to current conduction by a current through its emitter and base electrodes and thence through diode 80. Operation of transistor 82 is that of a switch, i.e., it rapidly changes from current non-conduction to conduction. Current from transistor 82 is supplied over line 90 to gate electrode 92G of silicon controlled rectifier 92, for rapidly switching the rectifier from current non-conduction to conduction, i.e., to an extremely low impedance. Resistor 94 and capacitor 96 are coupled between line 90 and ground reference potential. The low impedance of rectifier 92 as measured between junction 98 and ground reference potential is provided over line 100 to all applicable units of the transmitter, i.e., line 100 is equivalent to lines 52, 54 and 56 of FIG. 1.

The power supply 34 voltage supplied through switch 10A is provided over line 38, thence through filter resistor 102 and through resistor 106 to junction 98 and the rectifier 92. Capacitor 104 coacts with resistor 102 to suppress noise from closure of switch 10A.

As soon as rectifier 92 has been biased to current conduction, a large current flows through resistor 106 generating a substantial voltage differential thereacross. This voltage differential is supplied between lines 100 and 108 to actuate tone generator 58. The electrical impedance of rectifier 92, i.e., between line 100 and ground reference potential, is practically zero.

Figure 3:
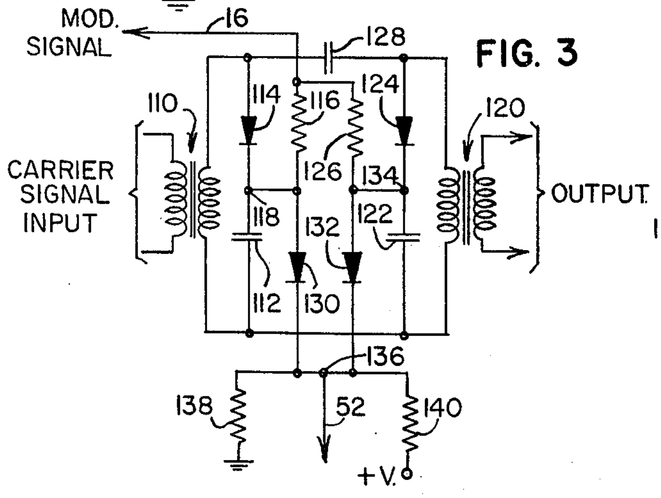
FIG. 3 is a partial schematic diagram of a modulator in which the carrier signal may be blocked by the FIG. 2 timing unit.

A tuned circuit usable as modulator 18 and having connections enabling detuning for suppressing carrier signal emission is shown in FIG. 3. The low impedance of rectifier 92 (FIG. 2) is provided to the illustrated modulator tuned circuit over line 52. The modulator consists of an input transformer 110 which receives the carrier signal. The carrier signal frequency at this point may be lower than the frequency of the signal emitted by antenna 24. The secondary of transformer 110 is tuned by capacitor 112 in series with varactor diode 114. A varactor diode is a diode that when reverse biased exhibits a capacitance which varies with the amplitude of the reverse biasing voltage. The modulating signal is provided over line 16 through resistor 116 to junction 118 between varactor diode 114 and capacitor 112. The modulating signal serves to vary the reverse bias of diode 114 and thereby its capacitance according to a modulating rate which then varies the phase of the carrier signal passing from carrier signal input transformer 110 to output transformer 120. The output transformer 120 has its primary winding in a portion of a tuned circuit including capacitor 122 and varactor diode 124. Varactor diode 124 is also variably reversed biased by the modulating signal from line 16 as applied through resistor 126. Coupling capacitor 128 completes the modulator.

The described modulator additionally has clamp diode 130 connected to junction 118 and clamp diode 132 connected to junction 134. The cathodes of the clamp diodes are commonly connected to junction 136 of a voltage divider including resistors 138 and 140. The divider opposing ends are respectively connected to ground reference potential and +V volts. The resistors are chosen such that clamp diodes 130 and 132 are biased to non-conduction even during modulation.

Normally rectifier 92 (FIG. 2) presents a high impedance to line 52 and does not enter into circuit operation. However, when rectifier 92 is switched to a low impedance by timing unit 46, junction 136 is essentially clamped at ground reference potental. At this time clamp diodes 130 and 132 are both forward biased for clamping junctions 118 and 134 at ground reference potential. This action effectively shorts out capacitors 112 and 122 of the modulator 18 tuned circuits effectively removing all tuning from the modulator. The carrier signal input transformer 110 is decoupled from output transformer 120. In this manner the emission of a carrier signal is inhibited.

Figure 4:
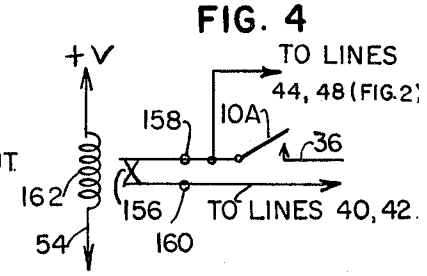
FIG. 4 is an abbreviated schematic diagram showing a relay which may be used to interrupt a supply voltage in the FIG. 1 embodiment.

Instead of detuning a tuned circuit in the carrier signal section of the illustrated transmitter, the power supply voltage provided over line 38 may be interrupted. According to FIG. 4 normally closed contacts 156 may be inserted in line 38 such that terminal 158 is connected to push-to-talk switch 10A and terminal 160 is connected to lines 40 and 42 (FIG. 1) connected to modulator 18 and amplifier 22. Contacts 156 are selectively opened by the coil 162 which has one end permanently connected to +V volt supply and an opposing end connected to line 54 which in turn is connected to line 100 of FIG. 2. When rectifier 92 conducts heavily, current flows from the +V supply through coil 162 actuating contacts 156 to open. It is understood that other means for interrupting the supply voltage between the power supply and its load may be used, including means (not shown) for deactivating certain portions of the power supply as by use of saturable reactors, saturable semiconductor devices or other switching means.

At the end of a transmission, the push-to-talk switch 10A is released, and this acts to reset the circuit and enable the transmitter for a new transmission. This causes the power supply voltage supplied over line 44 to be interrupted, thereby reverse biasing diode 72 (FIG. 2). Transistor 66 will again conduct, rapidly charging capacitor 74 of timing element 62. When the voltage on capacitor 74 exceeds the time limit expiration indicating amplitude, diode 80 in electro-responsive switch 50 will become reverse biased and cause transistor 82 to switch from current conduction to current non-conduction. Current from transistor 82 will no longer be supplied over line 90 to gate electrode 92G of silicon controlled rectifier 92, causing it to rapidly switch from current conduction to current non-conduction. The voltage differential across resistor 106 will decrease deactivating the tone generator, and the electrical impedance between line 100 and ground differential will become very large. The carrier signal is no longer suppressed nor is the power supply voltage blocked and a new transmission can now be initiated.

What is claimed is:

1. A transmitter control for a transmitter having a push-to-talk switch which is activated by an operator, for limiting the time during which carrier signal energy may be continuously transmitted by a transmitter, including in combination, timing means operative for a predetermined time period following actuation thereof, means coupling said timing means to the transmitter and responsive to activation of the transmitter to actuate said timing means to initiate the predetermined time period at the time the transmitter is activated for transmission, said timing means being operative to provide an indicating signal when the predetermined time period has expired, alerting means coupled to said timing means and responsive to said indicating signal to generate an operator alerting signal, and control means coupled to the transmitter and operative to inhibit operation of at least a portion thereof, said control means being coupled to said timing means and responsive to the indicating signal for making the transmitter effectively inoperative to transmit signal energy thereby limiting the time during which carrier signal energy may be continuously transmitted by the transmitter to the predetermined time period, said control means acting to terminate the transmission of the carrier signal even though the push-to-talk switch is held in the transmission position, said timing means including automatic reset means actuated in response to a deactivation of the transmitter to condition the transmitter control for a subsequent operation.

2. The transmitter control of claim 1 wherein said alerting means includes audio amplifier means and means coupled thereto for converting the same for operation as a tone generator, said last named means being responsive to said alerting system for rendering said audio amplifier operative as a tone generator to supply an audio signal to indicate that the transmitter is inoperative to transmit signal energy.

3. The transmitter control of claim 1 wherein said alerting means includes tone generation means and electro-acoustic means coupled thereto, said tone generation means being responsive to said indicating system to produce an audio signal reproduced by said electro-acoustic means to indicate termination of transmission of the carrier signal.

4. The transmitter control of claim 1 wherein said predetermined time period has a duration of the order of one minute.

5. In a transmitter having a carrier signal section for emitting carrier signals, a power supply portion for supplying an operating voltage to the section, and push-to-talk switch means for selectively actuating the power supply portion and the carrier signal section, and wherein the carrier signal section includes a tuned circuit, the improvement including in combination, a timer coupled to the transmitter and actuated in response to operation of the transmitter to initiate a predetermined time period and for producing an indicating signal at the end of the predetermined time period, said timer being operatively associated with the carrier signal section for indicating that the section has been actuated to transmit a carrier wave for the predetermined time period, control means coupled to the carrier signal section and to said timer and being operative to an active condition to inhibit the carrier signal section from emitting carrier signals, said control means being operated to the active condition in response to said timer indicating signal thereby limiting the time of transmission of carrier signals to the predetermined time period, said control means acting to terminate the transmission of the carrier signal even though the push-to-talk switch is held in the transmission position, and means for coupling said timer to the power supply portion and responsive to deactuation thereof to supply a voltage for resetting said timer and to hold such timer at a first state such that said control means is deactivated.

6. The combination of claim 5 wherein said control means is operatively connected to the tuned circuit of the transmitter for providing a low impedance path thereacross to selectively detune the tuned circuit into inoperativeness.

7. The combination of claim 5 wherein the power supply portion is connected to said control means and is responsive to the active condition thereof for removing an operating voltage from the carrier signal section.

8. The combination of claim 5 wherein said control means includes operator alerting means responsive to said indicating signal for indicating that the carrier signal section is inhibited from emitting carrier signals.

9. The combination of claim 8 wherein said operator alerting means includes an audio tone generator for producing an audio signal.

10. In a radio system including a transmitter having a carrier signal section for transmitting carrier signals, power supply means for supplying operating voltages to the section, and push-to-talk switch means for operation by an operator for selectively actuating the power supply means to cause operation of the carrier signal section, and including a receiver having an audio section with sound reproducing means for reproducing audio signals, a control system for limiting the time a carrier signal can be continuously transmitted by a single operation of the push-to-talk switch means including in combination, timing means operative to provide a control signal at the end of a predetermined timed period following actuation thereof, means coupling said timing means to the push-to-talk switch means and responsive to the operation of the switch means to actuate said timing means and initiate the predetermined timed period at the time the operating voltage is applied to the carrier signal section for causing the same to transmit a carrier signal, control means coupled to the transmitter and operative to terminate the transmission of carrier signals by the carrier signal section, said control means being coupled to said timing means and responsive to said control signal to inhibit at least a portion of the carrier signal section whereby the transmission of the carrier signal is terminated at the end of the predetermined timed period, said control means acting to terminate the transmission of the carrier signal even though the switch-to-talk switch is held in the transmission position, and means coupled to said timing means and to the receiver and responsive to said control signal to apply to the receiver a signal which operates to cause the sound reproducing means thereof to produce an alerting audio signal to indicate termination of transmission of carrier signals.

11. The combination of claim 10 wherein said timing means operates to provide a control signal at the end of a predetermined time period having a duration of the order of one minute.

12. The combination of claim 10 wherein said control means includes switch means operative to remove operating voltage from at least a portion of the carrier signal section.

References Cited

UNITED STATES PATENTS

| | | | |
|---|---|---|---|
| 2,766,324 | 10/1956 | Peth | 325—57 |
| 3,210,665 | 10/1965 | Street | 325—64 |
| 3,217,255 | 11/1965 | Broadhead | 325—64 |
| 3,292,085 | 12/1966 | Black | 325—64 |

ROBERT L. GRIFFIN, Primary Examiner

ALBERT J. MAYER, Assistant Examiner

U.S. Cl. X.R.

325—57, 64, 166, 169, 187, 189